United States Patent
Wu

(10) Patent No.: US 9,477,871 B2
(45) Date of Patent: Oct. 25, 2016

(54) METHOD AND DEVICE FOR DUAL LENS FINGERPRINT IDENTIFICATION

(75) Inventor: Chien-Hsing Wu, Kaohsiung (TW)

(73) Assignee: Gingy Technology Inc., Hsinchu (TW)

( * ) Notice: Subject to any disclaimer, the term of this patent is extended or adjusted under 35 U.S.C. 154(b) by 941 days.

(21) Appl. No.: 13/437,776

(22) Filed: Apr. 2, 2012

(65) Prior Publication Data
US 2013/0169780 A1    Jul. 4, 2013

(30) Foreign Application Priority Data
Jan. 4, 2012 (TW) ............... 101100341 A

(51) Int. Cl.
*H04N 7/18* (2006.01)
*G06K 9/00* (2006.01)

(52) U.S. Cl.
CPC ....... *G06K 9/00026* (2013.01); *G06K 9/00046* (2013.01)

(58) Field of Classification Search
CPC .................. G06K 9/00026; G06K 9/00046
See application file for complete search history.

(56) References Cited

U.S. PATENT DOCUMENTS

| | | | |
|---|---|---|---|
| 2001/0026632 A1* | 10/2001 | Tamai | 382/116 |
| 2003/0026607 A1* | 2/2003 | Okisu et al. | 396/213 |
| 2003/0167447 A1* | 9/2003 | Hatta et al. | 715/517 |
| 2005/0100200 A1* | 5/2005 | Abiko et al. | 382/124 |
| 2005/0249386 A1* | 11/2005 | Juh | 382/124 |
| 2006/0171453 A1* | 8/2006 | Rohlfing et al. | 375/240.01 |

\* cited by examiner

*Primary Examiner* — Tat Chio
(74) *Attorney, Agent, or Firm* — Jianq Chyun IP Office

(57) ABSTRACT

A dual lens fingerprint identification method comprises following steps. A first fingerprint image and a second fingerprint image of a finger in contact with a touch panel are captured by a first lens and a second lens respectively. The first fingerprint image and the second fingerprint image are partially overlapped with each other. An image processing procedure is performed to merge the first fingerprint image and the second fingerprint image into a third fingerprint image, and a calculation procedure is performed to compare a plurality of fingerprint characteristic points captured from the third fingerprint image with a plurality of preset characteristic points captured from a preset fingerprint image.

11 Claims, 15 Drawing Sheets

64

METHOD AND DEVICE FOR DUAL LENS FINGERPRINT IDENTIFICATION

CROSS-REFERENCE TO RELATED APPLICATIONS

This non-provisional application claims priority under 35 U.S.C. §119(a) on Patent Application No(s). 101100341 filed in Taiwan, R.O.C. on Jan. 4, 2012, the entire contents of which are hereby incorporated by reference.

BACKGROUND

1. Technical Field

The disclosure relates to a fingerprint identification method and a device using the method and more particularly to a dual lens fingerprint identification method and a device using the method.

2. Related Art

As information safety is getting more important, the requirement for identity verification is increasingly higher and higher to avoid forging and modifying identity. Identity verification methods such as inputting a password, swiping card, fingerprint/vocal print/retina identification have become common methods to be against crimes.

Generally, there are two methods for reading fingerprint in fingerprint identification devices. The first method is to read a fingerprint by fixing the finger on the fingerprint identification device, and the second method is to read a fingerprint by sliding the finger relative to a detecting unit of the fingerprint identification device. The fingerprint obtained by the first method is more accurate, but a larger reading area in the fingerprint identification device is needed in the first method than in the second method. Due to the movement speed of the finger and calibrating the offsetting during the reading, a fingerprint is more difficult to be read accurately by the second method than by the first method. Therefore, fingerprint identification devices using the first method are more widely used in equipment for guaranteeing information safety.

Conventionally, an optical fingerprint identification device which reads a fingerprint by fixing the finger comprises a touch panel, a plurality of light-emitting elements, a lens and a processing unit. The touch panel is used for contacting with a finger. The light-emitting elements provide the light beams required for capturing a fingerprint image of the finger contacted with the touch panel. The processing unit determines if the fingerprint image captured by the lens is in accordance with the preset fingerprint image. The conventional optical fingerprint identification device applies the principle of total reflection, and thus certain angles are required between the lens, the finger and the light source. Furthermore, the touch panel is made of one kind of prisms. Therefore, the conventional optical fingerprint identification device has a problem of large dimensions.

SUMMARY

In one aspect, a dual lens fingerprint identification method comprises: using a first lens to capture a first fingerprint image of a finger in contact with a touch panel and using a second lens to capture a second fingerprint image of the finger in contact with the touch panel, wherein the first fingerprint image and the second fingerprint image are partially overlapped with each other; and performing an image processing procedure to merge the first fingerprint image and the second fingerprint image into a third fingerprint image, and performing a calculation procedure to compare a plurality of fingerprint characteristic points captured from the third fingerprint image with a plurality of preset characteristic points captured from a preset fingerprint image.

In another aspect, a dual lens fingerprint identification device comprises a touch panel for contacting with a finger; a first lens for capturing a first fingerprint image of the finger in contact with the touch panel; a second lens for capturing a second fingerprint image of the finger in contact with the touch panel, the second lens and the first lens are disposed on a side of the touch panel opposite to the finger, and the second lens being is adjacent to the first lens, wherein first fingerprint image and the second fingerprint image are partially overlapped with each other; and a processing module coupled with the first lens and the second lens for performing an image processing procedure to merge the first fingerprint image and the second fingerprint image into a third fingerprint image, and performing a calculation procedure to compare a plurality of fingerprint characteristic points captured from the third fingerprint image with a plurality of preset characteristic points captured from a preset fingerprint image.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
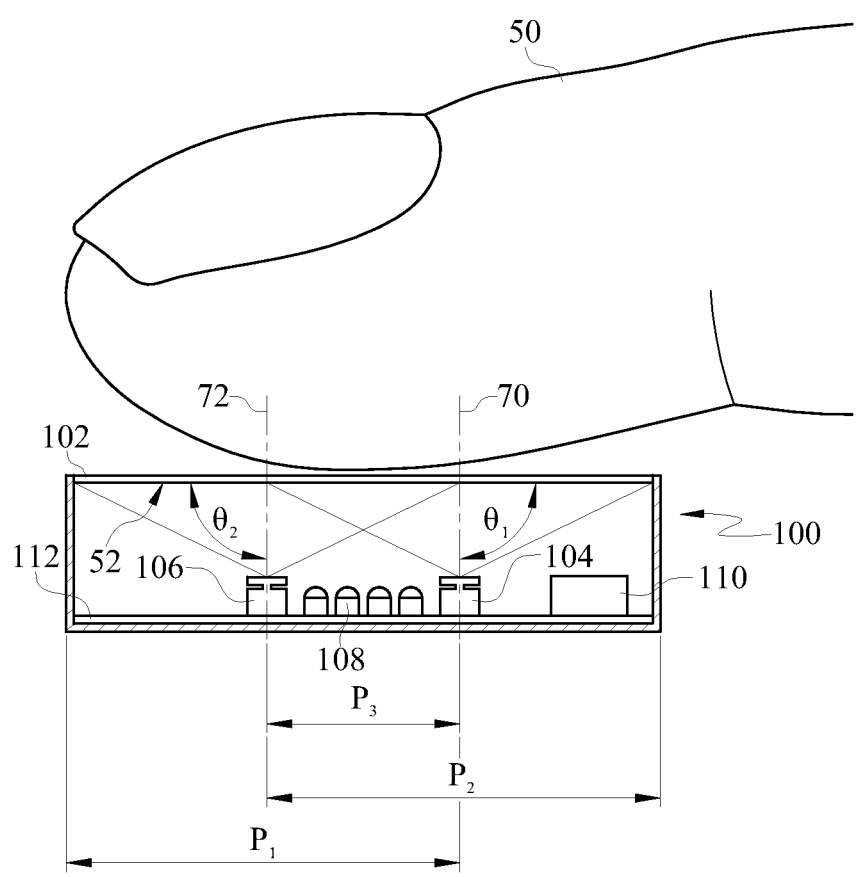
FIG. 1 is a cross-sectional view of a dual lens fingerprint identification device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2B:
FIG. 2B is an illustration of a second fingerprint image according to an embodiment of the disclosure.
Figure 2A:
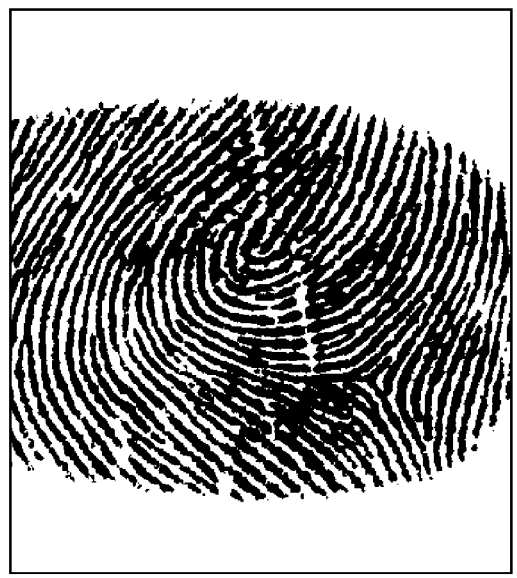
FIG. 2A is an illustration of a first fingerprint image according to an embodiment of the disclosure.
Figure 2C:
FIG. 2C is an illustration of an overlapped image as a result of the overlapping of the first fingerprint image in FIG. 2A and the second fingerprint image in FIG. 2B.

FIG. 1 is a cross-sectional view of a dual lens fingerprint identification device according to an embodiment of the disclosure. In this embodiment, a dual lens fingerprint identification device 100 comprises a touch panel 102, a first lens 104, a second lens 106, and a processing module 110. The touch panel 102 is used to be touched by a finger 50 of a user. The second lens 106 and the first lens 104 are disposed on a same side of the touch panel 102, and they are disposed adjacent to each other. The first lens 104 is used for capturing a first fingerprint image 60 (i.e. the image of the area P1) of the finger 50. The second lens 106 is used for capturing a second fingerprint image 62 (i.e. the image of the area P2. FIG. 2A and FIG. 2B respectively show the first fingerprint image 60 and the second fingerprint image 62 according to an embodiment of the disclosure. As shown by FIG. 1, the first fingerprint image 60 and the second fingerprint image 62 are partially overlapped with each other (i.e. the overlapped image of the area P3. FIG. 2C shows the overlapped image of the area P3 according to an embodiment of the disclosure.

It should be noted that, FIG. 1 is a cross-sectional view of the dual lens fingerprint identification device 100, and thus the area P1, the area P2 and the area P3 are shown as line segments in FIG. 1. Furthermore, the touch panel 102 can be made of but not limited to optical glass BK7 or polymethyl methacrylate (PMMA). The first lens 104 and the second lens 106 can be but not limited to Charge Coupled Device cameras (CCD camera) or Complementary Metal Oxide Semiconductor sensors (CMOS sensor).

Furthermore, the dual lens fingerprint identification device 100 captures the first fingerprint image 60 and the second fingerprint image 62 by using the principles of total reflection and half scattering, and thus the touch panel 102 may be a transparent flat board, but it is not limited to it.

Figure 3:
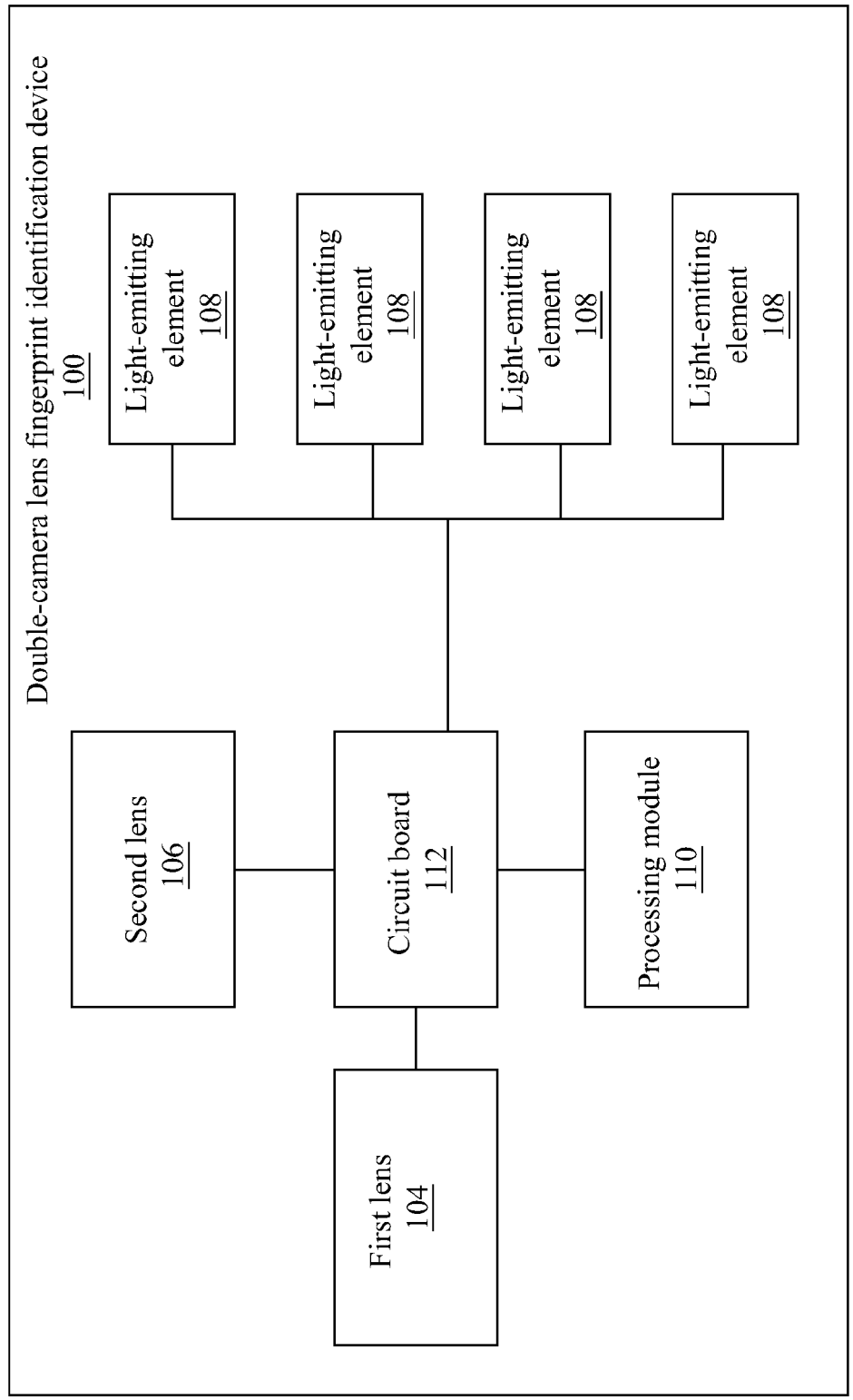
FIG. 3 is a framework illustration of the dual lens fingerprint identification device in FIG. 1.

FIG. 3 is a framework illustration of the dual lens fingerprint identification device of FIG. 1. The processing module 110 is coupled with the first lens 104 and the second lens 106. Furthermore, the dual lens fingerprint identification device 100 further comprises at least one light-emitting element 108 and a circuit board 112. Each of the light-emitting elements 108 provides the light required for capturing the first fingerprint image 60 and the second fingerprint image 62 by using the first lens 104 and the second lens 106. The first lens 104, the second lens 106, the processing module 110, and each of the light-emitting elements 108 can be disposed on the circuit board 112, so that the processing module 110 is coupled with the first lens 104, the second lens 106, and each of the light-emitting elements 108. The light-emitting elements 108 can be but are not limited to light-emitting diodes (LED).

Figure 4:
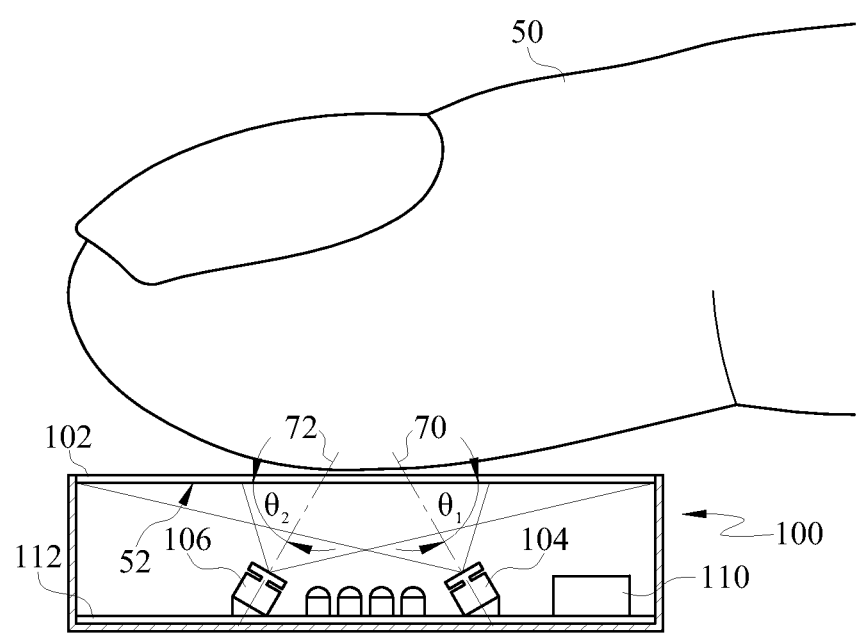
FIG. 4 is a cross-sectional view of the dual lens fingerprint identification device according to another embodiment of the disclosure.

In this embodiment, the first lens 104 comprises a first optical axis 70, and the second lens 106 comprises a second optical axis 72. The touch panel 102 comprises a surface 52. A first angle $\theta_1$ between the first optical axis 70 and the surface 52 is 90 degrees, and a second angle $\theta_2$ between the second optical axis 72 and the surface 52 is also 90 degrees, but the disclosure is not limited this way. For examples, FIG. 4 is a cross-sectional view of a dual lens fingerprint identification device according to another embodiment of the disclosure. In this embodiment, the first angle $\theta_1$ between the first optical axis 70 and the surface 52 may be between 40 degrees and 85 degrees, and the second angle $\theta_2$ between the second optical axis 72 and the surface 52 may be between 40 degrees and 85 degrees. The first angle $\theta_1$ and the second angle $\theta_2$ can be adjusted according to the practical requirements. Furthermore, the touch panel 102 can be a trapezium or a prism transparent board besides a transparent flat board, and this can be determined according to the practical requirements.

Figure 5:
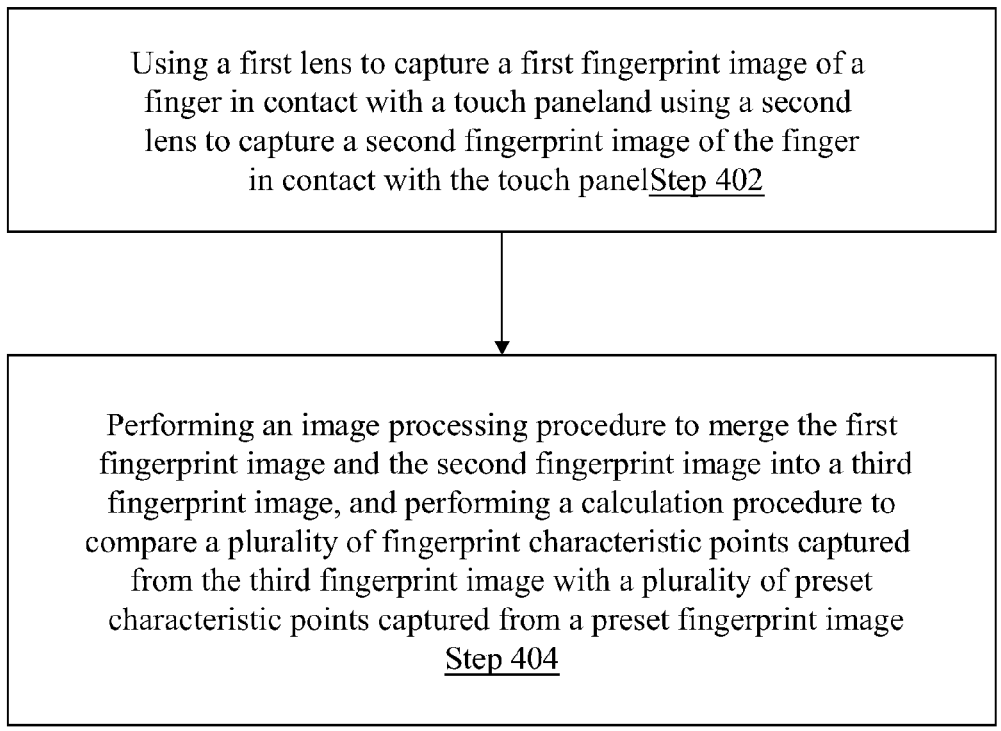
FIG. 5 is a flowchart of the dual lens fingerprint identification method employed in the dual lens fingerprint identification device of FIG. 1.

FIG. 5 is a flowchart of a dual lens fingerprint identification method according to the embodiment of FIG. 1. The dual lens fingerprint identification method comprises steps of:

step 402: The first fingerprint image of a finger in contact with the touch panel is captured by the first lens and a second fingerprint image of the finger in contact with the touch panel is captured by the second lens, and the first fingerprint image and the second fingerprint image are partially overlapped with each other; and step 404: an image processing procedure is performed to merge the first fingerprint image and the second fingerprint image into a third fingerprint image, and a calculation procedure is performed to compare a plurality of fingerprint characteristics captured from the third fingerprint image with a plurality of preset characteristics captured from a preset fingerprint image.

Before the processing module 110 performs the step 402, the processing module 110 may set a plurality of first photographing parameters for the first lens 104 and a plurality of second photographing parameters for the second lens 106. More specifically, before capturing the first fingerprint image 60 and the second fingerprint image 62 by the first lens 104 and the second lens 106, the processing module 110 turns off a first automatic white balance mode and a first automatic exposure mode of the first lens 104 as well as a second automatic white balance mode and a second automatic exposure mode of the second lens 106. Then, the processing module 110 adjusts a first gray parameter, a first brightness parameter and a first contrast parameter of the first lens 104 as well as a second gray parameter, a second brightness parameter and a second contrast parameter of the second lens 106. Based on the first photographing parameters for the first lens 104 and the second photographing parameters for the second lens 106, the first fingerprint image 60 and the second fingerprint image 62 captured by the first lens 104 and the second lens 106 are clearer.

Figure 7:
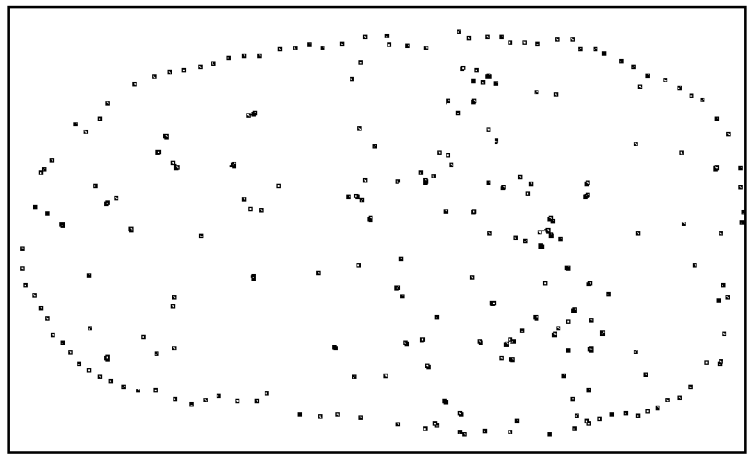
FIG. 7 is an illustration of a plurality of characteristic points of the third fingerprint image according to an embodiment of the disclosure.
Figure 6:
FIG. 6 is an illustration of a third fingerprint image according to an embodiment of the disclosure.

After the first photographing parameters for the first lens 104 and the second photographing parameters for the second lens 106 are set by the processing module 110, the first lens 104 captures the first fingerprint image 60 and the second lens 106 captures the second fingerprint image 62 (i.e. step 402). Finally, the processing module 110 receives and processes the first fingerprint image 60 captured by the first lens 104 and the second fingerprint image 62 captured by the second lens 106, and merges the first fingerprint image 60 and the second fingerprint image 62 into a third fingerprint image 64 (Please refer to FIG. 6, which is an illustration of the third fingerprint image 64). As a result, a plurality of fingerprint characteristic points of the third fingerprint image 64 are captured (Please refer to FIG. 7, which is an illustration of a plurality of characteristic points of the third fingerprint image 64). Then, a calculation procedure is performed to compare the plurality of fingerprint characteristic points captured from the third fingerprint image 64 with those captured from a preset fingerprint image. The preset fingerprint image is the user's fingerprint image, whose preset characteristic points are stored in the dual lens identification device 100 (i.e. step 404).

Figure 8:
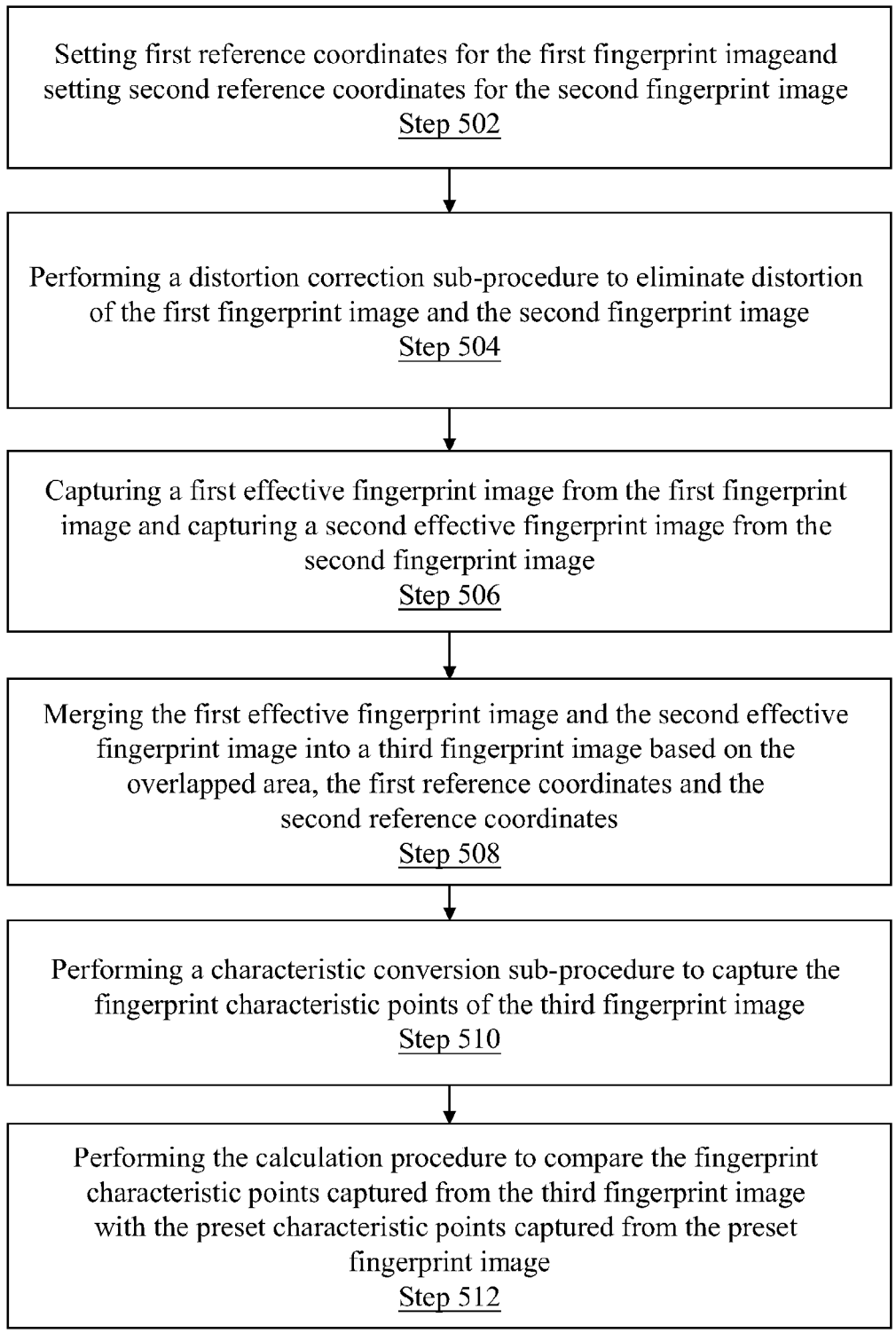
FIG. 8 is a flowchart of the image processing procedure in step 404 in FIG. 5.

More specifically, please refer to FIG. 8, which is a flowchart of the image processing procedure for the step 404 in FIG. 5. The image processing procedure comprises steps of:

step 502: the first reference coordinates are set for the first fingerprint image and the second reference coordinates are set for the second fingerprint image;

step 504: a distortion correction sub-procedure is performed to eliminate the distortion of the first fingerprint image and the second fingerprint image;

step 506: the first effective fingerprint image is captured from the first fingerprint image and the second effective fingerprint image is captured from the second fingerprint image, and the first effective fingerprint image and the second effective fingerprint image are overlapped to form an overlapped area;

step 508: the first effective fingerprint image and the second effective fingerprint image are merged into the third fingerprint image based on the overlapped area, the first reference coordinates and the second reference coordinates;

step 510: a characteristic conversion sub-procedure is performed to capture a plurality of fingerprint characteristic points of the third fingerprint image; and step 512: a calculation procedure is performed to compare the plurality of fingerprint characteristic points captured from the third fingerprint image with a plurality of preset characteristic points captured from a preset fingerprint image.

Figure 9B:
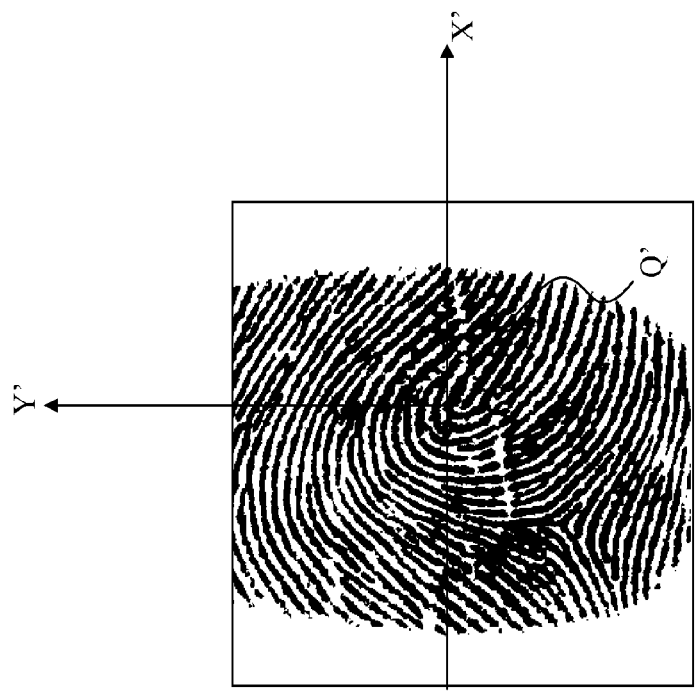
FIG. 9B is an illustration of the second fingerprint image in the step 502 in FIG. 8.
Figure 9A:
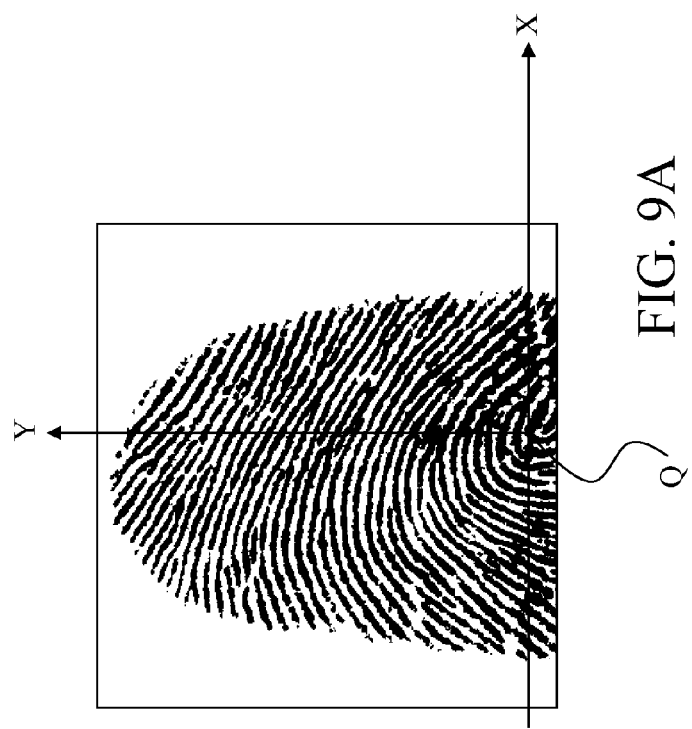
FIG. 9A is an illustration of the first fingerprint image in step 502 in FIG. 8.

In the image processing procedure, the processing module 110 sets the first fingerprint central point Q of the first fingerprint image 60 as the first original point of the first reference coordinates (XY coordinates), and sets the second fingerprint central point Q' of the second fingerprint image 62 as the second original point of the second reference coordinates (X'Y' coordinates) (please refer to FIGS. 9A and 9B, which are illustrations of the first fingerprint image and the second fingerprint image in the step 502 in FIG. 8).

Then, the processing module 110 performs the distortion correction sub-procedure is performed to eliminate the distortion of the first fingerprint image 60 and the second fingerprint image 62. The distortion correction sub-procedure (please refer to FIG. 10, which is an illustration of the distortion correction sub-procedure in the step 504 in FIG. 8) comprises steps of:

step 602: the first fingerprint image is cut into a plurality of first sub-images and the second fingerprint image is cut into a plurality of second sub-images; and step 604: each of the plurality of first sub-images is corrected based on the first distortion list and each of the plurality of second sub-images is corrected based on the second distortion list.

Figure 10:
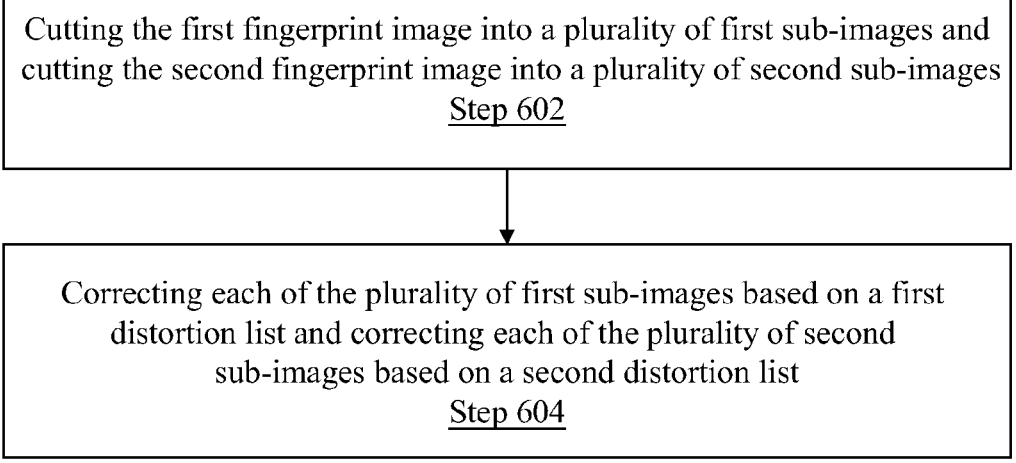
FIG. 10 is an illustration of a distortion correction subprocedure in the step 504 in FIG. 8.
Figure 11B:
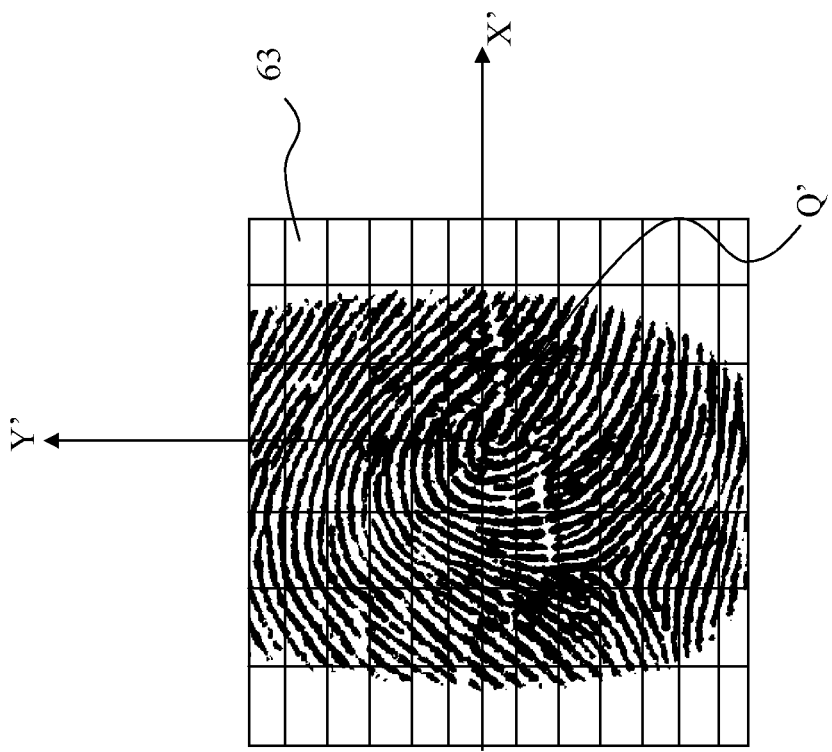
FIG. 11B is an illustration of the second fingerprint image in step 602 in FIG. 10.
Figure 11A:
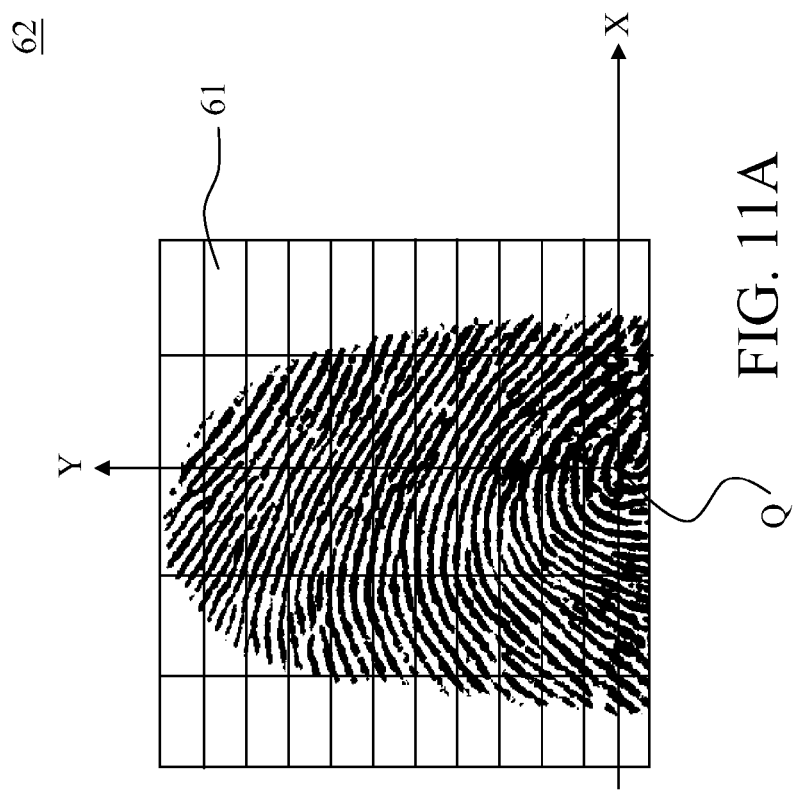
FIG. 11A is an illustration of the first fingerprint image in step 602 in FIG. 10.

In particular, in the distortion correction sub-procedure, the processing module 110 cuts the first fingerprint image 60 into a plurality of first sub-images 61, and cuts the second fingerprint image 62 into a plurality of second sub-images 63 (please refer to FIGS. 11A and 11B, which are illustrations of the first fingerprint image and the second fingerprint image in the step 602 in FIG. 10). Then, the processing module 110 corrects the distortion of each of the of first sub-images 61 based on the first distortion list stored in the dual lens fingerprint identification device 100 and the relative coordinates of each of the of first sub-images 61, and also corrects the distortion of each of the second sub-images 63 based on the second distortion list stored in the dual lens fingerprint identification device 100 and the relative coordinates of each of the of second sub-images 63.

Figure 12B:
FIG. 12B is an illustration of a second effective fingerprint image in the step 506 in FIG. 8.
Figure 12A:
FIG. 12A is an illustration of a first effective fingerprint image in step 506 in FIG. 8.

The first fingerprint image 60 and the second fingerprint image 62 have the fingerprint images which are not required by the dual lens fingerprint identification device 100 for fingerprint identification. These images are for example the blank spaces of the first fingerprint image 60 and the second fingerprint image 62, or the unclear areas around the first fingerprint image 60 and the second fingerprint image 62. In order to eliminate parts of the blank spaces in the first fingerprint image 60 and the second fingerprint image 62, the processing module 110 performs the step 506 (please refer to FIGS. 12A and 12B, which are illustrations of the first fingerprint image and the second fingerprint image in the step 506 in FIG. 8), but the disclosure is not limited this way. The resolution of the first effective fingerprint image 82 and the second effective fingerprint image 84 meet the requirement of the dual lens fingerprint identification device 100, and the first effective fingerprint image 82 and the second effective fingerprint image 84 are overlapped to form an overlapped area 86. In this embodiment, the resolution of the first effective fingerprint image 82 and the second effective fingerprint image 84 can be but is not limited to be 500 dots per inch (dpi).

After capturing the first effective fingerprint image 82 and the second effective fingerprint image 84, the processing module 110 seeks the relative positional relationship between the first effective fingerprint image 82 and the second effective fingerprint image 84 based on the overlapped area 86, the first reference coordinates (XY coordinates) and the second reference coordinates (X'Y' coordinates). Then, the processing module 110 merges the first effective fingerprint image 82 and the second effective fingerprint image 84 into the third fingerprint image 64 (please refer to FIG. 6) based on the relative positional relationship between the first effective fingerprint image 82 and the second effective fingerprint image 84. It should be noted that, the resolution of the third fingerprint image 64 meet the requirement of the dual lens fingerprint identification device 100. In this embodiment, the resolution of the third fingerprint image 64 can be but is not limited to be 500 dpi.

Figure 13:
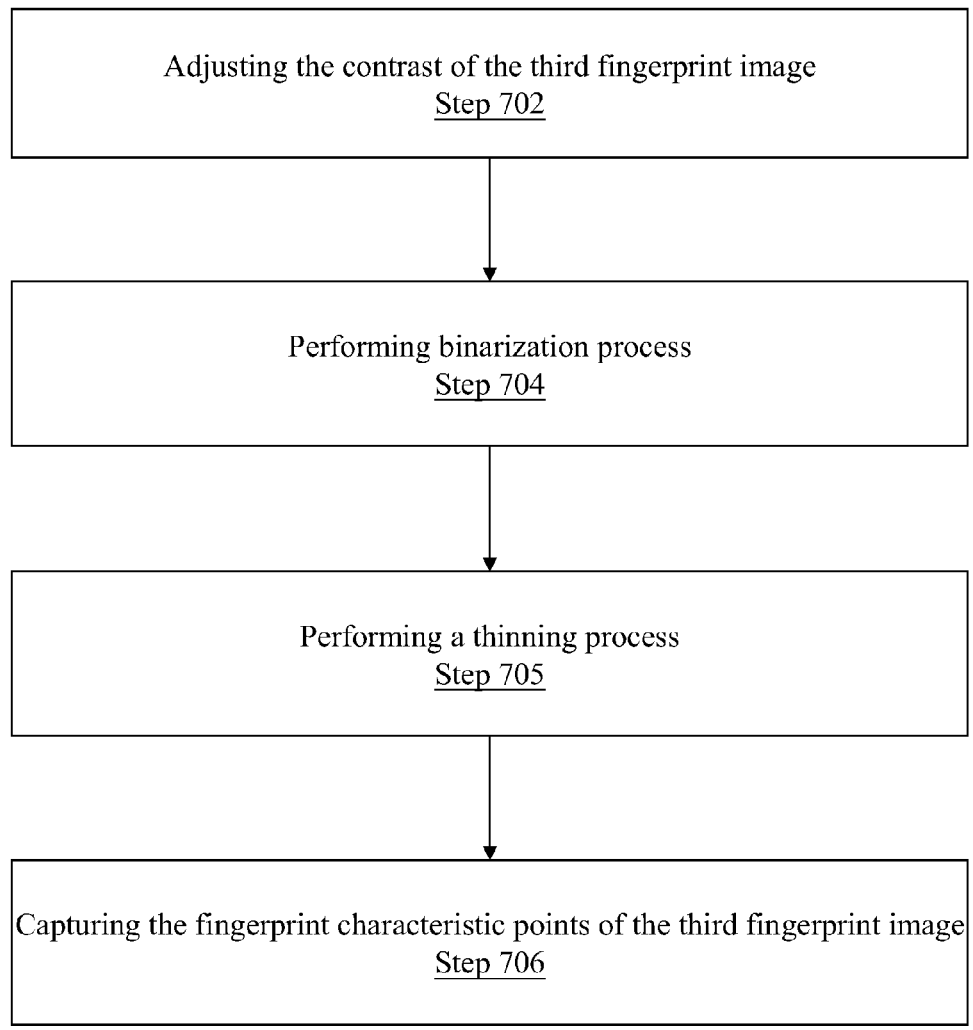
FIG. 13 is an illustration of a characteristic conversion sub-procedure in step 510 in FIG. 8.

Finally, the processing module 110 performs the characteristic conversion sub-procedure to output a plurality of fingerprint characteristic points of the third fingerprint image 64. The characteristic conversion sub-procedure (please refer to FIG. 13, which is an illustration of the characteristic conversion sub-procedure in the step 510 in FIG. 8) comprises steps of:

step 702: the contrast of the third fingerprint image is adjusted;

step 704: a binarization process is performed;

step 705: a thinning process is performed; and step 706: a plurality of fingerprint characteristic points of the third fingerprint image are captured.

Figure 14:
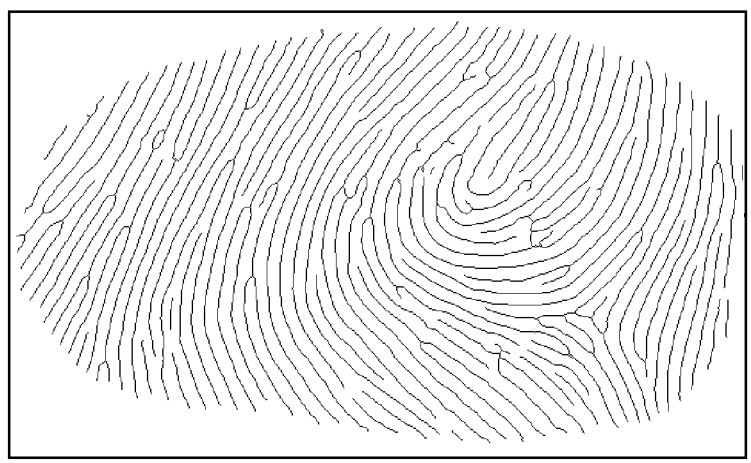
FIG. 14 is an illustration of the third fingerprint image in step 705 in FIG. 13.

In the characteristic conversion sub-procedure, the processing module 110 adjusts the contrast of the third fingerprint image 64 so that the plurality of fingerprint characteristic points of the third fingerprint image 64 are more distinct. Because the fingerprint segments of the third fingerprint image 64 are too close to be identified, the processing module 110 performs the thinning process on the fingerprint segments after the binarization process. In this way, the plurality of characteristic points can be identified more easily (please refer to FIG. 14, which is an illustration of the third fingerprint image in the step 705 in FIG. 13. Finally, the processing module 110 captures and outputs the plurality of fingerprint characteristic points of the third fingerprint image 64 after the thinning process. The plurality of fingerprint characteristic points of the third fingerprint image 64 may be but are not limited to be end points, fork points, type lines, cores or deltas.

After outputting the plurality of fingerprint characteristic points of the third fingerprint image 64, the processing module 110 performs a calculation procedure to compare the characteristic points (i.e. preset characteristic points) in the storing unit 114 with the fingerprint characteristic points of the third fingerprint image 64. When the fingerprint characteristic points of the third fingerprint image 64 are in accordance with the characteristic points in the storing unit 114, the processing module 110 transmits a confirmation signal, but when the fingerprint characteristic points of the third fingerprint image 64 are not in accordance with the characteristic points in the storing unit 114, the processing module 110 transmits an error signal.

Figure 15:
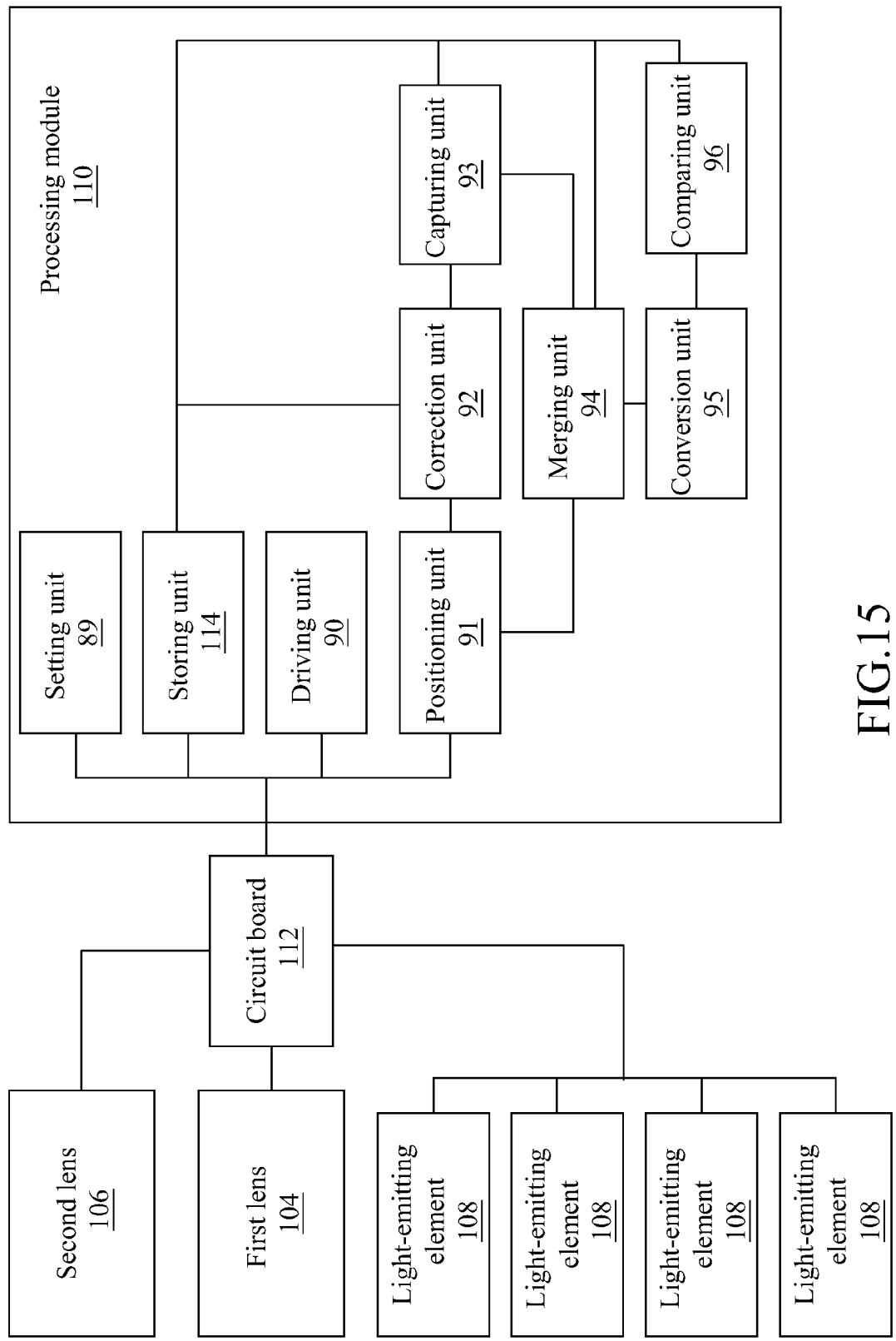
FIG. 15 is a framework illustration of a processing module in FIG. 1.

Furthermore, the processing module 110 may further comprise a setting unit 89, a driving unit 90, a positioning unit 91, a correction unit 92, a capturing unit 93, a merging unit 94, a conversion unit 95, a comparing unit 96 and the storing unit 114 (please refer to FIG. 15, which is a framework illustration of the processing module in FIG. 1). The setting unit 89, the driving unit 90, the positioning unit 91 and the storing unit 114 are coupled with the first lens 104 and the second lens 106. The correction unit 92 is coupled with the positioning unit 91 and the storing unit 114. The capturing unit 93 is coupled with the correction unit 92 and the storing unit 114. The merging unit 94 is coupled with the positioning unit 91, the capturing unit 93 and the storing unit 114. The conversion unit 95 is coupled with the merging unit 94. The comparing unit 96 is coupled with the conversion unit 95 and the storing unit 114.

The setting unit 89 is used to set the first photographing parameters for the first lens 104 and the second photographing parameters for the second lens 106. The driving unit 90 is used for performing the step 402. The positioning unit 91 is used for performing the step 502. The correction unit 92 is used for performing the step 504. The capturing unit 93 is used for performing the step 506. The merging unit 94 is used for performing the step 508. The conversion unit 95 is used for performing the step 510. The comparing unit 96 is used for performing the step 512. The storing unit 114 is used for storing the characteristics (i.e. preset characteristic points), the first fingerprint image 60, the second fingerprint image 62, the third fingerprint image 64, the first effective fingerprint image 82, the second effective fingerprint image 84, the first distortion list and the second distortion list In this embodiment, the storing unit 114 may be but is not limited to be random access memory (RAM), flash memory or read only memory (ROM).

According to the embodiments of the dual lens fingerprint identification method and device, the thickness (i.e. the distance between the lens and the touch panel) of the dual lens fingerprint identification device can be reduced due to the dual lens (the first lens and the second lens). Therefore, the technical problem that the application fields are limited because of the bulky size of the conventional optical fingerprint identification device can be solved. Furthermore, compared with a same size fingerprint identification device, the dual lens fingerprint identification method and device according to the present disclosure can capture a fingerprint image with increased area, so that it can be more accurately determined that whether, a fingerprint image on the touch panel meets a preset fingerprint image. As a result, information safety can be enhanced.

Furthermore, according to the embodiments of the lens fingerprint identification method and device, the first fingerprint image and the second fingerprint image are captured based on the principles of total reflection and half scattering, and thus only small angles are required between the lenses, the finger and the light source. Additionally, it is not necessary to make the touch panel made of a prism with a large thickness to capture fingerprint images. Therefore, the dual lens fingerprint identification device according to the present disclosure has smaller dimensions.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A dual lens fingerprint identification method, comprising steps of:
   using a first lens to capture a first fingerprint image of a finger in contact with a touch panel and using a second lens to capture a second fingerprint image of the finger in contact with the touch panel, wherein the first fingerprint image and the second fingerprint image are partially overlapped with each other; and
   performing an image processing procedure to merge the first fingerprint image and the second fingerprint image into a third fingerprint image, and performing a calculation procedure to compare a plurality of fingerprint characteristic points captured from the third fingerprint image with a plurality of preset characteristic points captured from a preset fingerprint image,
   wherein the first lens comprises a first angle formed between a first optical axis of the first lens and a surface of the touch panel, and the second lens comprises a second angle formed between a second optical axis of the second lens and the surface, wherein at least one of the first angle and the second angle is between 40 degrees and 85 degrees.

2. The dual lens fingerprint identification method as claimed in claim 1, wherein the image processing procedure comprises steps of:
   setting first reference coordinates for the first fingerprint image;
   setting second reference coordinates for the second fingerprint image;
   performing a distortion correction sub-procedure to eliminate distortion of the first fingerprint image and the second fingerprint image;
   capturing a first effective fingerprint image from the first fingerprint image and capturing a second effective fingerprint image from the second fingerprint image, wherein the first effective fingerprint image and the second effective fingerprint image are overlapped to form an overlapped area;

merging the first effective fingerprint image and the second effective fingerprint image into a third fingerprint image based on the overlapped area, the first reference coordinates and the second reference coordinates;

performing a characteristic conversion sub-procedure to capture the plurality of fingerprint characteristic points of the third fingerprint image; and performing the calculation procedure to compare the plurality of fingerprint characteristic points captured from the third fingerprint image with the plurality of preset characteristic points captured from the preset fingerprint image.

3. The dual lens fingerprint identification method as claimed in claim 2, before the step of using the first lens to capture the first fingerprint image of the finger in contact with the touch panel and using the second lens to capture the second fingerprint image of the finger in contact with the touch panel, further comprising a step of:

setting a plurality of first photographing parameters for the first lens and a plurality of second photographing parameters for the second camera.

4. The dual lens fingerprint identification method as claimed in claim 3, in the step of setting the first photographing parameters for the first lens and the second photographing parameters for the second lens, further comprising steps of:

turning off a first automatic white balance mode and a first automatic exposure mode of the first lens as well as a second automatic white balance mode and a second automatic exposure mode of the second lens; and adjusting a first gray parameter, a first brightness parameter and a first contrast parameter of the first lens as well as a second gray parameter, a second brightness parameter and a second contrast parameter of the second lens.

5. The dual lens fingerprint identification method as claimed in claim 2, in the steps of setting the first reference coordinates for the first fingerprint image and setting the second reference coordinates for the second fingerprint image, further comprising steps of:

setting a first fingerprint central point of the first fingerprint image as a first original point of the first reference coordinates; and setting a second fingerprint central point of the second fingerprint image as a second original point of the second reference coordinates.

6. The dual lens fingerprint identification method as claimed in claim 2, wherein the distortion correction sub-procedure comprises steps of:

cutting the first fingerprint image into a plurality of first sub-images and cutting the second fingerprint image into a plurality of second sub-images; and correcting the plurality of first sub-images based on a first distortion list and correcting the plurality of second sub-images based on a second distortion list.

7. A dual lens fingerprint identification device, comprising:

a touch panel for contacting with a finger;
a first lens for capturing a first fingerprint image of the finger in contact with the touch panel;
a second lens for capturing a second fingerprint image of the finger in contact with the touch panel, the second lens and the first lens are disposed on a side of the touch panel opposite to the finger, and the second lens being is adjacent to the first lens, wherein first fingerprint image and the second fingerprint image are partially overlapped with each other; and a processing module coupled with the first lens and the second lens for performing an image processing procedure to merge the first fingerprint image and the second fingerprint image into a third fingerprint image, and performing a calculation procedure to compare a plurality of fingerprint characteristic points captured from the third fingerprint image with a plurality of preset characteristic points captured from a preset fingerprint image, wherein the first lens comprises a first angle forming between a first optical axis of the first lens and a surface of the touch panel, and the second lens comprises a second angle formed between a second optical axis of the second lens and the surface, wherein at least one of the first angle and the second angle is between 40 degrees and 85 degrees.

8. The dual lens fingerprint identification device as claimed in claim 7, wherein the processing module comprises:

a driving unit coupled with the first lens and the second lens for driving the first lens to capture the first fingerprint image and driving the second lens to capture the second fingerprint image;

a positioning unit coupled with the first lens and the second lens for setting first reference coordinates for the first fingerprint image and setting second reference coordinates for the second fingerprint image;

a correction unit coupled with the positioning unit for performing a distortion correction sub-procedure to eliminate distortion of the first fingerprint image and the second fingerprint image;

a capturing unit coupled with the correction unit for receiving the first fingerprint image and the second fingerprint image after the distortion correction sub-procedure, and capturing a first effective fingerprint image from the first fingerprint image and capturing a second effective fingerprint image from the second fingerprint image, wherein the first effective fingerprint image and the second effective fingerprint image are overlapped to form an overlapped area;

a merging unit coupled with the positioning unit and the capturing unit for merging the first effective fingerprint image and the second effective fingerprint image into a third fingerprint image based on the overlapped area, the first reference coordinates and the second reference coordinates;

a conversion unit coupled with the merging unit for performing a characteristic conversion sub-procedure to capture the plurality of fingerprint characteristic points of the third fingerprint image; and a comparing unit coupled with the conversion unit for performing a calculation procedure to compare the plurality of fingerprint characteristic points captured from the third fingerprint image with the plurality of preset characteristic points captured from the preset fingerprint image.

9. The dual lens fingerprint identification device as claimed in claim 8, wherein the processing module further comprises a setting unit coupled with the first lens and the second lens for setting a plurality of first photographing parameters for the first lens and a plurality of second photographing parameters for the second lens.

10. The dual lens fingerprint identification device as claimed in claim 9, wherein the first photographing parameters include a first gray parameter, a first brightness parameter and a first contrast parameter of the first lens when a first automatic white balance mode and a first automatic exposure mode of the first lens are turned off, the second photographing parameters include a second gamma parameter, a second brightness parameter and a second contrast parameter of the second lens when a second automatic white balance mode and a second automatic exposure mode of the second lens are turned off.

11. The dual lens fingerprint identification device as claimed in claim 8, wherein the positioning unit is used for setting a first fingerprint central point of the first fingerprint image as a first original point of the first reference coordinates and setting a second fingerprint central point of the second fingerprint image as a second original point of the second reference coordinates.

\* \* \* \* \*